(12) United States Patent
Häring et al.

(10) Patent No.: US 9,403,162 B2
(45) Date of Patent: *Aug. 2, 2016

(54) IONOMERS WITH IONIC GROUPS IN THE SIDE CHAIN

(71) Applicants: Thomas Häring, Stuttgart (DE); Rima Häring, Stuttgart (DE)

(72) Inventors: Thomas Häring, Stuttgart (DE); Jochen Kerres, Ostfildern-Ruit (DE); Martin Hein, Stuttgart (DE)

(73) Assignees: Thomas Häring, Stuttgart (DE); Rima Häring, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/293,904

(22) Filed: Nov. 12, 2014

(65) Prior Publication Data

US 2015/0064609 A1 Mar. 5, 2015

Related U.S. Application Data

(63) Continuation of application No. 13/330,614, filed on Dec. 19, 2011, now Pat. No. 8,742,021, which is a continuation of application No. 11/573,982, filed as application No. PCT/DE2005/001504 on Aug. 20, 2005, now abandoned.

(30) Foreign Application Priority Data

Aug. 20, 2004 (DE) .......................... 10 2004 041 336

(51) Int. Cl.
| | |
|---|---|
| B01J 39/10 | (2006.01) |
| B01D 67/00 | (2006.01) |
| B01D 71/68 | (2006.01) |
| C08G 65/48 | (2006.01) |
| C08J 5/22 | (2006.01) |
| H01M 8/10 | (2016.01) |
| B01J 39/18 | (2006.01) |
| B01D 71/82 | (2006.01) |
| C08G 75/02 | (2016.01) |
| H01M 8/02 | (2016.01) |

(52) U.S. Cl.
CPC ........... *B01J 39/185* (2013.01); *B01D 67/0006* (2013.01); *B01D 67/0093* (2013.01); *B01D 71/68* (2013.01); *B01D 71/82* (2013.01); *C08G 65/48* (2013.01); *C08G 75/0286* (2013.01); *C08J 5/2231* (2013.01); *C08J 5/2256* (2013.01); *H01M 8/0291* (2013.01); *H01M 8/103* (2013.01); *H01M 8/1023* (2013.01); *H01M 8/1025* (2013.01); *H01M 8/1027* (2013.01); *H01M 8/1032* (2013.01); *H01M 8/1039* (2013.01); *H01M 8/1072* (2013.01); *B01D 2325/16* (2013.01); *C08J 2365/02* (2013.01); *C08J 2381/06* (2013.01); *H01M 2300/0082* (2013.01); *Y02E 60/523* (2013.01); *Y02P 70/56* (2015.11)

(58) Field of Classification Search
CPC ........... C08L 27/04; C08L 9/00; C08L 39/04; C08F 8/40; B01J 39/18; B01J 39/195; B01D 67/0006; B01D 67/0093; B01D 71/68; B01D 71/82; C08G 65/48; C08G 75/0286; C08J 5/2231; C08J 5/2256; H01M 8/1023; H01M 8/1025; H01M 8/1027; H01M 8/103; H01M 8/1032; H01M 8/1039; H01M 8/1072; H01M 8/0291
USPC ................. 525/214, 235, 203, 204, 340, 344; 521/27, 28, 30
See application file for complete search history.

(56) References Cited

U.S. PATENT DOCUMENTS

| | | | | |
|---|---|---|---|---|
| 6,723,757 B1 * | 4/2004 | Kerres | ................... | B01D 71/52 521/27 |
| 7,288,599 B2 * | 10/2007 | Kerres | ............... | B01D 67/0093 525/319 |

FOREIGN PATENT DOCUMENTS

| | | | |
|---|---|---|---|
| WO | 03072641 A1 | 4/2003 | |
| WO | WO 03072641 A1 * | 9/2003 | ......... B01D 67/0093 |

OTHER PUBLICATIONS

Wainright, et al., Acid-Doped Polybenzimidazoles: A New Polymer Electrolyte, from J. Electrochem Society, vol. 142, No. 7, Jul. 1995, pp. L121-L123.
Allcock, et al., Phosphonation of Aryloxyphosphazenes, from Macromolecules 2001, 34, pp. 6915-6921.
Written Opinion of the International Searching Authority, PCT / DE2005 / 001504, applicant Thomas Haring, Aug. 20, 2005, 7 pages.

* cited by examiner

*Primary Examiner* — Michael M Bernshteyn
(74) *Attorney, Agent, or Firm* — Edward C. Kwok; Hogan Lovells US LLP

(57) ABSTRACT

Ionomers and ionomer membranes, consisting of a non-fluorinated or partly fluorinated non-, partly or fully-aromatic main chain and a non- or partly-fluorinated side chain with ionic groups or their non-ionic precursors, have a positive impact on the proton conductivity of the ionomers. Various processes produce these polymeric proton conductors. The membranes are useful for fuel cell applications.

15 Claims, 15 Drawing Sheets

Fig. 4 Reaction of side-chain halogenated polymers via Michaelis-Arbusov-Reaction Fig. 7    Suitable nucleophiles.

Fig. 8  Reaction of a side-chain halogenated polymer with lithium sulfinato-phenylphosphonic acid dialkylester

IONOMERS WITH IONIC GROUPS IN THE SIDE CHAIN

CROSS-REFERENCE TO RELATED APPLICATIONS

The present application is a continuation application claiming priority of U.S. application Ser. No. 13/330,614, entitled "Ionomers with Ionic Groups in the Side Chain," filed on Dec. 19, 2011, now U.S. Pat. No. 8,742,021, which is a continuation of U.S. patent application Ser. No. 11/573,982, entitled "Ionomers with Ionogenic Groups in the Side Chain," filed on Apr. 1, 2009, now abandoned, which is a national phase filing claiming priority of PCT International Application, serial no. PCT/DE05/01504, filed on Aug. 20, 2005, which claims priority of German Application, serial no. 102004041336.3, filed on Aug. 20, 2004.

SUMMARY

It is claimed:
Ionomer membranes, consisting of a non-fluorinated or partly fluorinated non-, partly or fully-aromatic main chain and a non- or partly-fluorinated side chain with ionic groups or their non-ionic precursors.
Process for the production of the above mentioned ionomer membranes.

STATE-OF-THE-ART

Ionomer membranes containing phosphoric acid or phosphonic acid have received in recent years a growing interest because the phosphoric and phosphonic acid groups show water-free proton conductivity, in that phosphoric acid groups or phosphonic acid groups can act as proton donator as well as proton acceptor. This water-free proton conductivity of phosphoric acids is especially interesting for fuel cells in the temperature range between 100° C. and 200° C., because in this temperature range in fuel cells the vapour pressure of water is very low so that sulfonic acid containing ionomer membranes do not work anymore, because they need water molecules as proton acceptors. From the literature several membrane types are known, whose proton conductivity is generated from phosphoric acid or phosphonic acids.

There are for example:
Blend membranes made of polybenzimidazole (PBI) and phosphoric acid with 5 to 6 phosphoric acid molecules per PBI repeating unit[1,2]. These membranes work at temperatures greater than 100° C. in the fuel cell very well, however phosphoric acid can be transported below 100° C. out of the membrane resulting in a decrease of conductivity and corrosion problems.

[1] Wainwright J. S.; Wang, J-T; Weng, D.; Savinell, R. F.; Litt, M. H. *J. Electrochem. Soc.* 1995, 142, L121
[2] Calundann, G., Sansone, B., Benicewicz, B., Choe, E. W., Uensal, Oe., Kiefer, J., DE 10246459 A1, 2004

Phosphonated poly(phosphazene) obtained by reaction of brominated poly(bisphenoxyphosphazene) with t-butyllithium, followed by reaction with chlorophosphoric acid diphenylester and finally partial hydrolysis of the formed phosphonic acid diphenylester to the free phosphonic acid[3]. A disadvantage of this reaction is that only a part of the lithiated groups reacts with the chlorophosphoric acid ester, and only a part of the formed phosphonic acid ester groups reacts to the free phosphonic acid group.

[3] H. R. Allcock, M. A. Hofmann, R. M. Wood, Macromolecules 2001, 34, 6915-6921

Phosphonated poly(ethersulfon)e from brominated poly(ethersulfon)e by the Michaelis-Arbusov reaction[4]. A disadvantage of these polymers is, that the phosphonic acid groups are directly attached to the aromatic main chain, which has a negative impact on the proton conductivity, because the aryl main chain polymers are very stiff polymers and also with this method only a very limited number of phosphonic acid groups can be attached to the aromatic main chain polymer, which results in a great distance between the proton conducting groups and in turn in a low proton conductivity.

[4] K. Jakoby et al, D E Offen 101 48 131 A1

For sulfonated ionomers it has been shown, that the arrangement of the sulfonic acid groups in the side chain results in an increase in proton conductivity above 100° C. as compared with sulfonated ionomers with the sulfonic acid groups in the aromatic main chain. In a specific example the proton conductivities of sulfonated PEEK (sPEEK) and of poly(carbonylphenoxy)phenylene ("Poly-X 2000") at 120° C. have been compared[5]. The Poly-X 2000 polymer was at 120° C. much more proton conducting than sPEEK. Disadvantages of this polymer are the expensive production process and the great stiffness of the polymer main chain and side chain.

[5] N. Ogato, M. Rikukawa, WO 94/24717

Purpose

The aim of the invention is to provide ionomers and ionomer membranes with the ionic group on a flexible side chain which has a positive impact on the proton conductivity of the ionomers. The aim is furthermore to provide processes for the production of these polymeric proton conductors.

Ionomers according to the invention are shown in FIG. 1.

DESCRIPTION

Surprisingly it has been found that ionomers and ionomer membranes with ionic groups or their non-ionic precursors at the end of a flexible side chain can be obtained by method 1 with the following steps:

1a: the starting polymer is deprotonated by a metal organic reaction;
1b: the deprotonated polymer is reacted with an aliphatic halogen compound, which has preferentially a halogen atom at one end and a non-ionic precursor of the ionic group at the other, wherein the halogen is exchanged nucleophilically;
1c: the non-ionic form of the ionic group is hydrolysed, whereby the protonic form of the cation exchange group is liberated.

Figure 1:
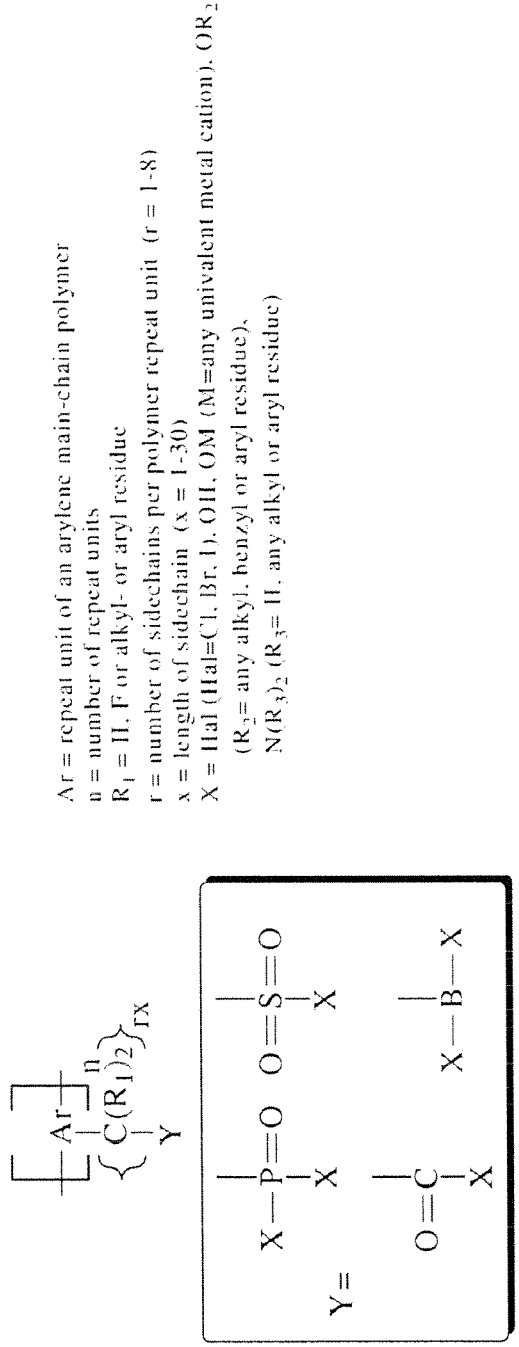
FIG. 1 shows a polymer having repeating units $\{Ar-[C(R_1)_2]_{rx}Y\}_n$, in which Ar is an arylene repeating unit in the main chain, n is an integer, $R_1$ is H, F, alkyl or aryl residue, r is a number of side chains per main chain repeating unit between 1-8, x is the length of each side chain between 1-30, and Y is one of the species shown, each specie further including substituent X, being a halogen, —OH, —OM, —$OR_2$, or —$N(R_3)_2$, in which M is a univalent metal cation, and $R_2$ and $R_3$ are each H, an alkyl, benzyl or aryl residue.
Figure 2:
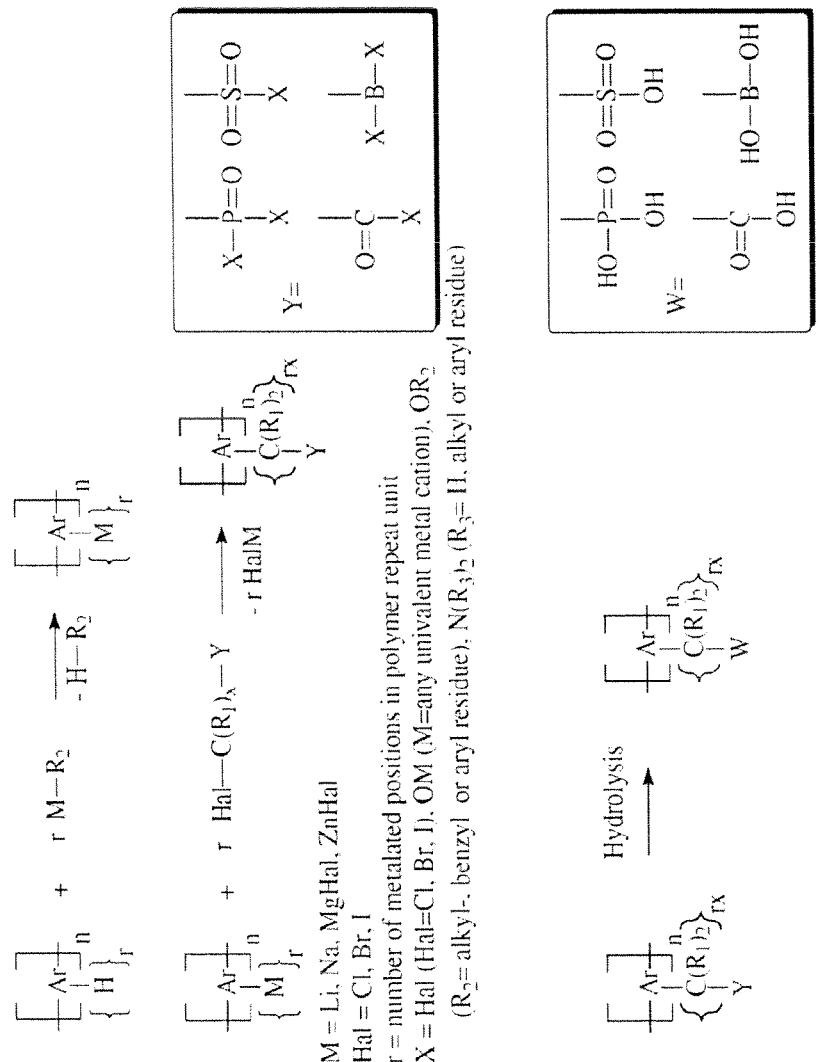
FIG. 2 illustrates method 1 for obtaining ionomers and ionomer membranes with ionic groups or their non-ionic precursors at the end of a flexible side chain, according to one embodiment of the present invention.

The method 1 is depicted in FIG. 2.

Surprisingly it has been found that also method 2 leads to ionomers and ionomer membranes with a proton conducting group in the side chain:

2a: the starting polymer is deprotonated by a metal organic reaction;
2b: the deprotonated polymer is reacted with an excess of an aliphatic dihalogen compound or a mixture of different dihalogen compounds (different halogenes and/or different chain lengths of the dihalogen compound(s) are possible), which carry preferentially the halogen compounds at the end of the molecule, whereby a part of the halogen atoms of the dihalogen compound(s) are exchanged nucleophilically: Ar—Li+Hal-$((C(R_2)_2)_x$-Hal→Ar—$((C(R_2)_2)_x$-Hal;
2c: the polymers carrying the nucleophilically exchangeable halogens in the side chain are reacted with a compound carrying a nucleophilic group Nu and one or more ionic group(s) or their non-ionic form Y. In doing so the remaining halogens are exchanged nucleophilically;
2d: the non-ionic form of the ionic group is hydrolysed, whereby the protonic form of the cation exchange group is liberated.

Figure 3:
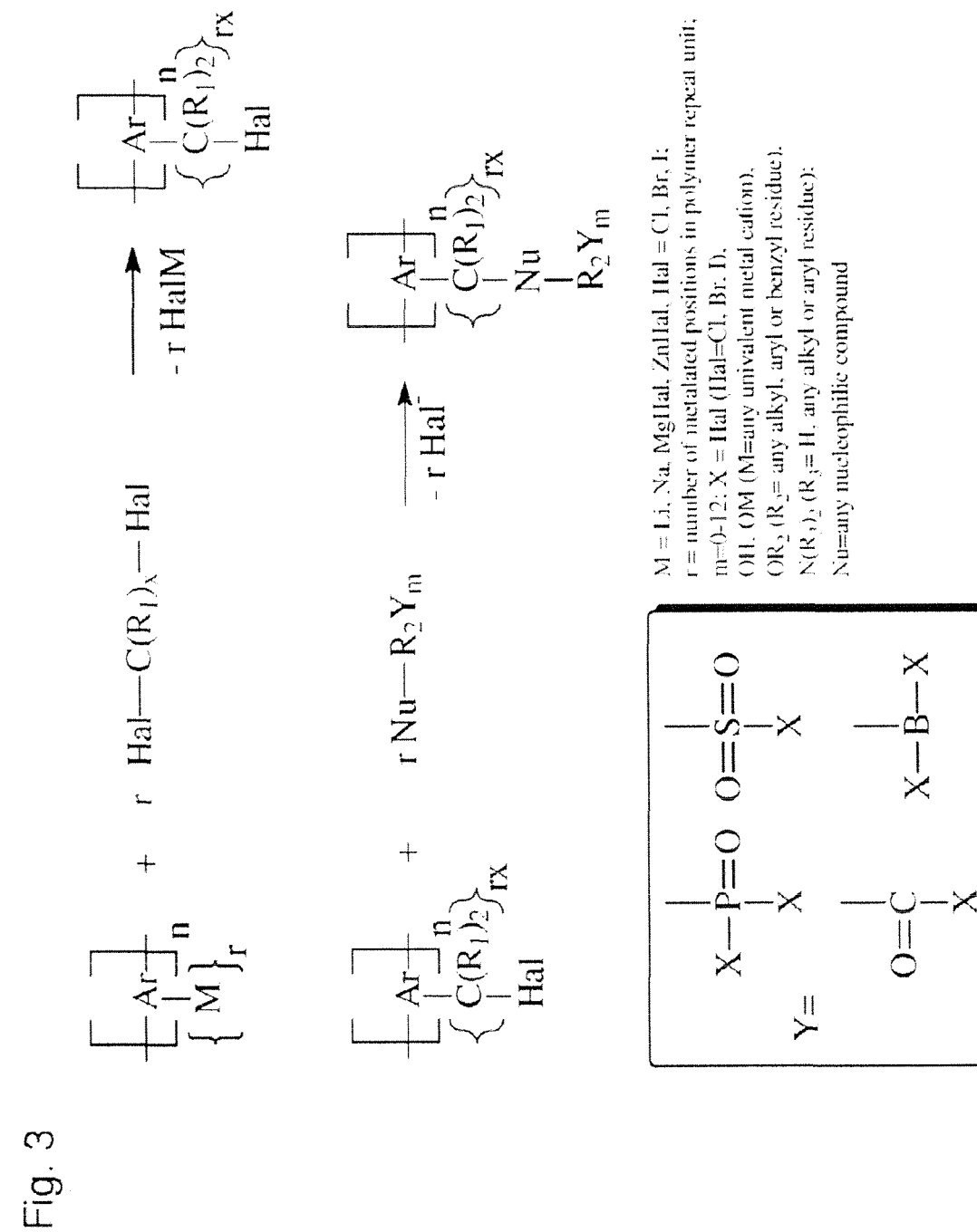
FIG. 3 illustrates method 2 for obtaining ionomers and ionomer membranes with a proton conducting group in the side chain, according to one embodiment of the present invention.

The method 2 is depicted in FIG. 3.

Figure 4:
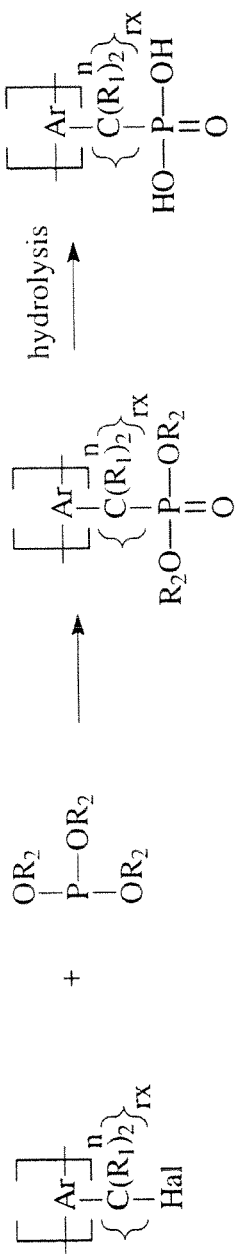
FIG. 4 illustrates converting side chain halogenated polymers via Michaelis-Arbusov reaction or related reactions and subsequent hydrolysis towards polymers with the phosphonic acid group in the side chain, in accordance with one embodiment of the present invention.

Surprisingly it has been found that the side chain halogenated polymers can be converted via Michaelis-Arbusov reaction or related reactions and subsequent hydrolysis towards polymers with the phosphonic acid group in the side chain. This reaction is depicted in FIG. 4.

As polymer main chains all kinds of polymers are possible. Preferred as main chains are however:

polyolefines like polyethylene, polypropylene, polyisobutylene, polynorbornene, polymethylpentene, poly(1,4-isoprene), poly(3,4-isoprene), poly(1,4-butadiene), poly(I,2-butadiene) and block copolymers, alternating copolymer or statistical copolymers of polydienes polybutadiene and polyisoprene with styrole, styrole(co)polymers like polystyrole, poly(methylstyrole), poly($\alpha,\beta,\beta$-trifluorstyrole), poly(pentafluorostyrole)

perfluorinated ionomers like Nafion® or the $SO_2$Hal-precursor of Nafion® (Hal=F, Cl, Br, I), Dow®-Membrane, GoreSelect®-Membrane.

partly fluorinated polymers like polyvinylidenfluoride, polyvinylfluoride and their copolymers with polyolefines or with aryl main chain polymers from FIG. 5 (see below)

N-basic polymers like polyvinylcarbazole, polyethylenimine, poly(2-vinylpyridine), poly(3-vinylpyridine), poly(4-vinylpyridine)

Figure 5:
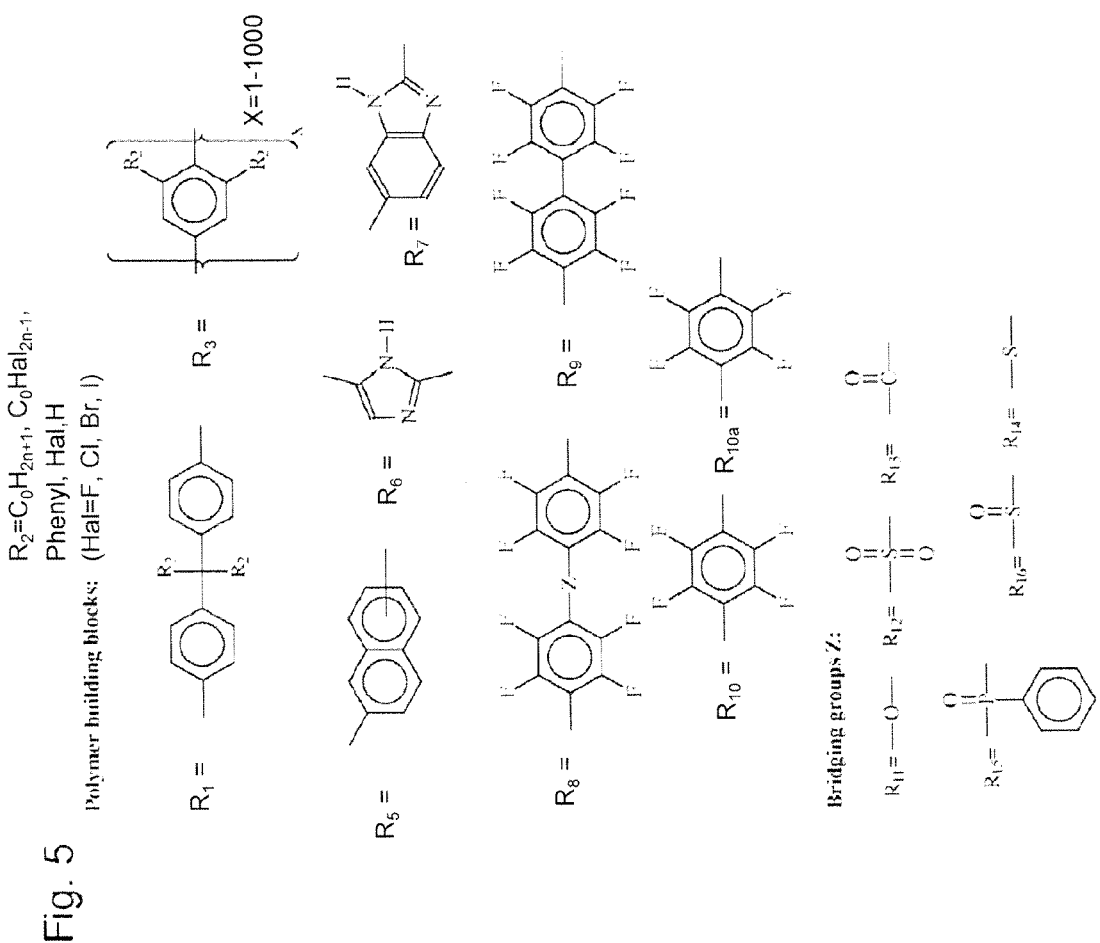
FIG. 5 shows (het)aryl main chain polymers containing the building blocks of the present invention.

(Het)aryl main chain polymers, containing the building block depicted in FIG. 5.

Particularly preferred are (Het)aryl main chain polymers like:

Polyetherketones like polyetherketone PEK Victrex®, polyetheretherketone PEEK Victrex®, polyetheretherketoneketone PEEKK, polyetherketoneetherketoneketone PEKEKK Ultrapek®

Polyethersulfones like polysulfone Udel®, polyphenylsulfone Radel R®, Polyetherethersulfone Radel A®, polyethersulfone PES Victrex®

Poly (Benz)imidazole like PBI Celazol® and others the (Benz)imidazole-group containing oligomers and polymer, in which the (Benz)imidazole group can be available in the main chain or in the side chain Polyphenyleneether like poly(2,6-dimethyloxyphenylene), poly(2,6-diphenyloxyphenylene)

Polyphenylenesulfide and copolymers

Poly(1,4-phenylene) or Poly (1,3-phenylene), which can be modified in the lateral group if necessary with benzoyl, naphtoyl or o-phenyloxy-1,4-benzoyl group, m-phenyloxy-1,4-benzoyl group or p-phenyloxy-1,4-benzoyl group.

Poly(benzoxazole) and copolymers
Poly(benzthiazole) and copolymers
Poly(phtalazinone) and copolymers
Polyaniline and copolymers
Polythiazole
Polypyrrole.

Suitable reagents for the deprotonation of the aryl polymer are n-butyllithium, sec-butyllithium, tert. butyllithium, methyllithium, phenyllithium, Grignard compounds like phenyl-magnesiumhalide and other Grignard compounds, lithium diisopropylamide, and other lithium amides, sodium naphtalide, potassium naphtalide, zinc organic compounds ("Rieke metals").

Suitable solvents for the metal organic reaction are ether solvents like THF, diethylether, glyme, diglyme, triglyme, dioxane and other ether solvents as well as hydrocarbon solvents $C_nH_{2n+2}$, cyclohexane, benzene, toluene, xylole and other C—H— aromatic solvents and any other mixtures thereof and with ether solvents.

Some of the suitable compounds with nucleophilically substitutable halogens and ionogenic groups or their non-ionic precursors for the reaction with the deprotonated polymers are depicted in FIG. 2. Particularly preferred are compounds of the type Hal-$(CH_2)_x$—Y (Y see FIG. 2, x=1-20).

The compounds with nucleophilically substitutable halogens and ionogenic groups may contain as halogene F, Cl, Br, or I. Preferred are Cl, Br and I. Also mixtures of organic compounds with different halgenes and different alkyl chain lengths can be used.

Suitable dihalogene compounds for the reaction with the deprotonated polymers are: Hal-$(C(R_1)_2)_x$-Hal (Hal=F, Cl, Br, I; $R_1$=H, F, $C_nH_{2n+1}$, aryl). The dihalogen alcanes according to the invention method 2 can be also mixed dihalogen alcanes, that is compounds like Br—$(C(R_1)_2)_x$—I, where both halogen atoms have different reactivity to assure that no cross-linking takes place during method 2. If for example the compound I—$(CH_2)_x$—Cl is reacted with lithiated PSU, I is preferred to be exchanged nucleophilically. Thereby Cl, Br and I are preferred. Also mixtures of dihalogene compounds with different halgenes and different alkyl chain lengths can be used. Also compounds like Hal-$(C(R_1)_2)_x$-Aryl-Hal are possible. According to the invention also Hal-$(C(R_1)_2)_x$—Z-Aryl-Hal are possible.

Figure 6:
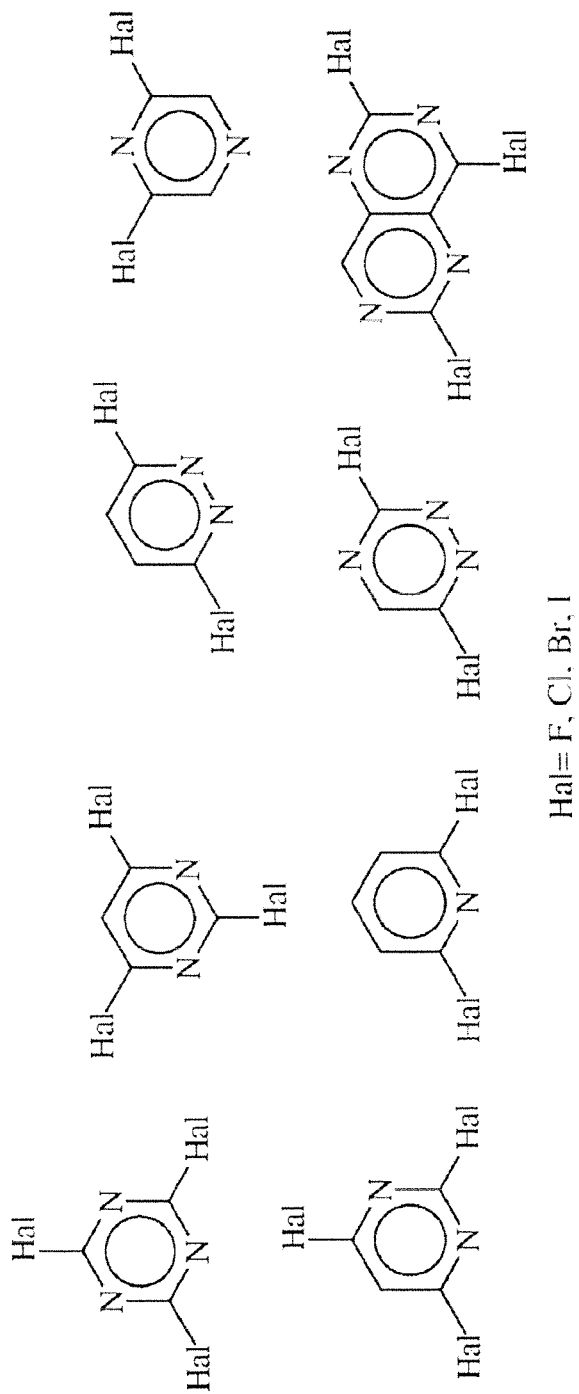
FIG. 6 shows some halogenated hetaromates that can be used in accordance with one embodiment of the present invention.

Also in another embodiment of the invention halogenated hetaromates can be used. Some of these hetaromates are shown in FIG. 6. The hetaromates may contain in addition organic rests which do not react with the reactands of the process according to the invention.

Figure 7:
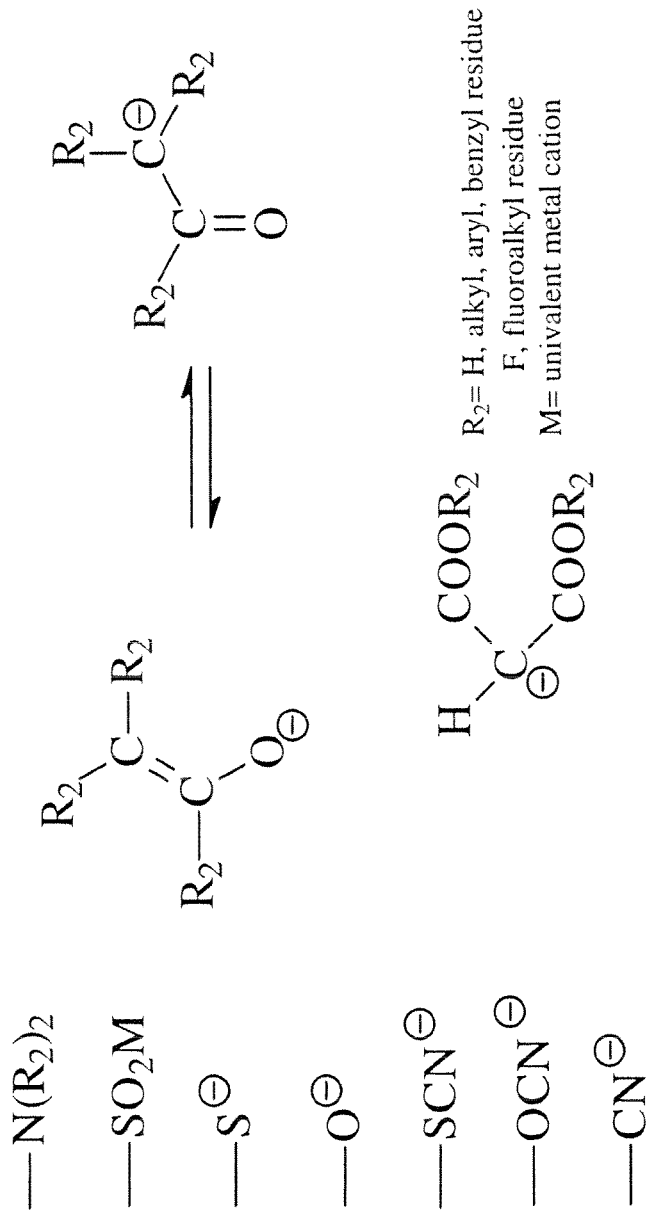
FIG. 7 shows some nucleophilic groups for the reaction with the side chain halogenated polymers, according to one embodiment of the present invention.

Suitable nucleophilic groups for the reaction with the side chain halogenated polymers are shown in FIG. 7.

Figure 8:
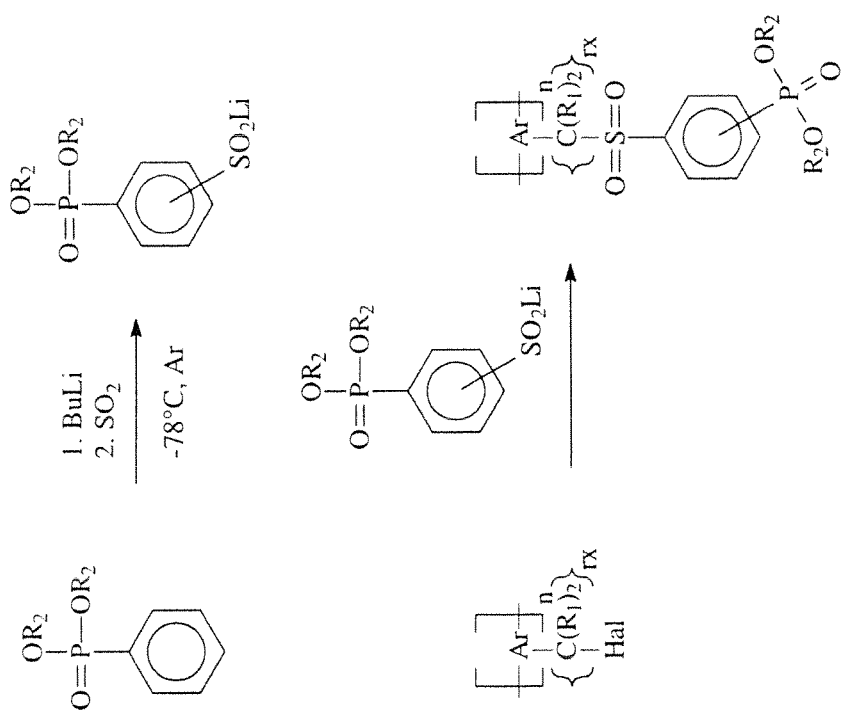
FIG. 8 shows a reaction wherein a side-chain halogenated polymer reacts with a compound with a $SO_2M$ group (e.g., a lithium sulfinatophenylphosphonic acid dialkylester), M being a metal, according to one embodiment of the present invention.
Figure 9:
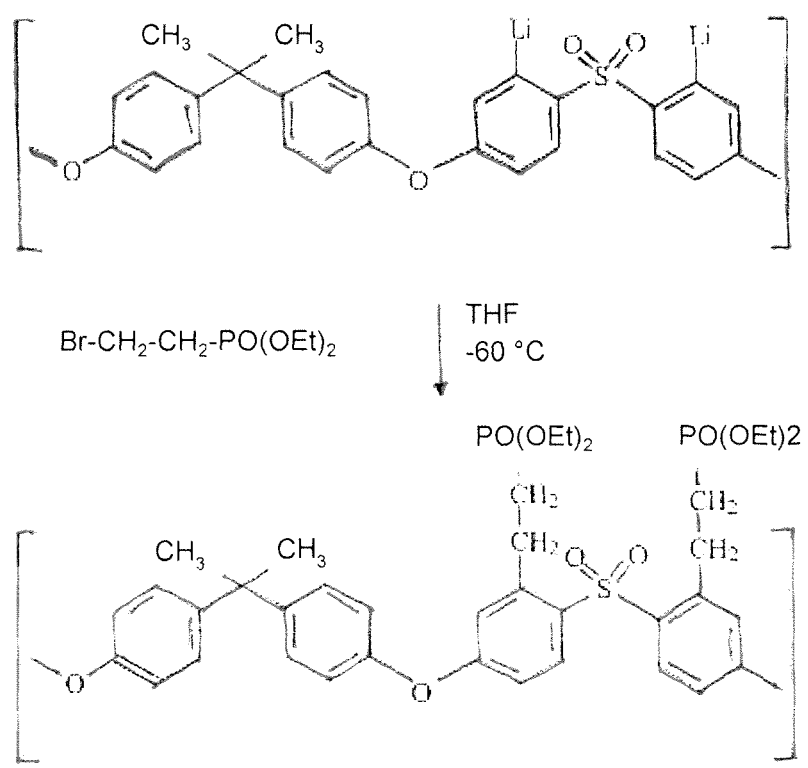
FIG. 9 illustrates a reaction of lithiated PSU with Diethyl-2-Bromethylphosphonate, in accordance with one embodiment of the present invention.
Figure 10:
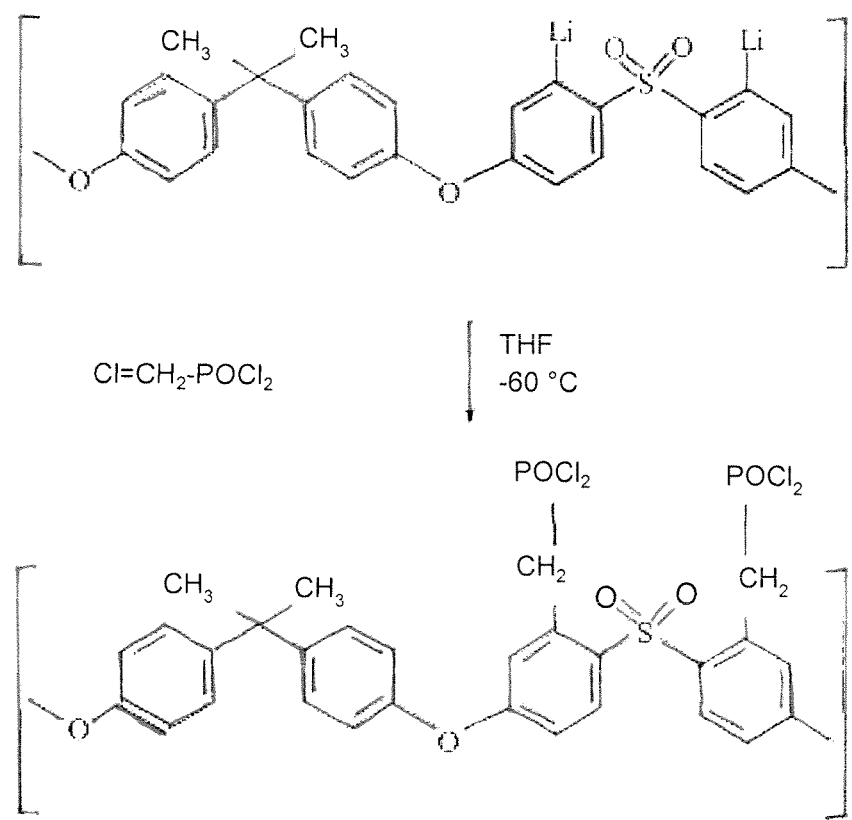
FIG. 10 illustrates a reaction of dilithiated PSU with chloro-methanphosphonochloride, in accordance with one embodiment of the present invention.
Figure 11:
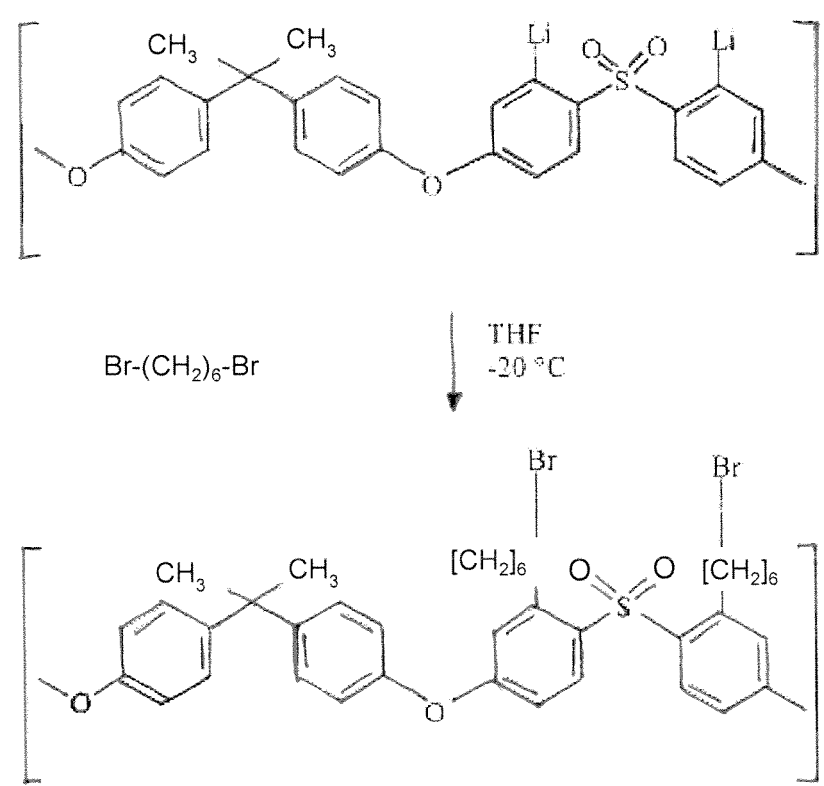
FIG. 11 illustrates a reaction of dilithiated PSU with dibromhexane, in accordance with one embodiment of the present invention.
Figure 12:
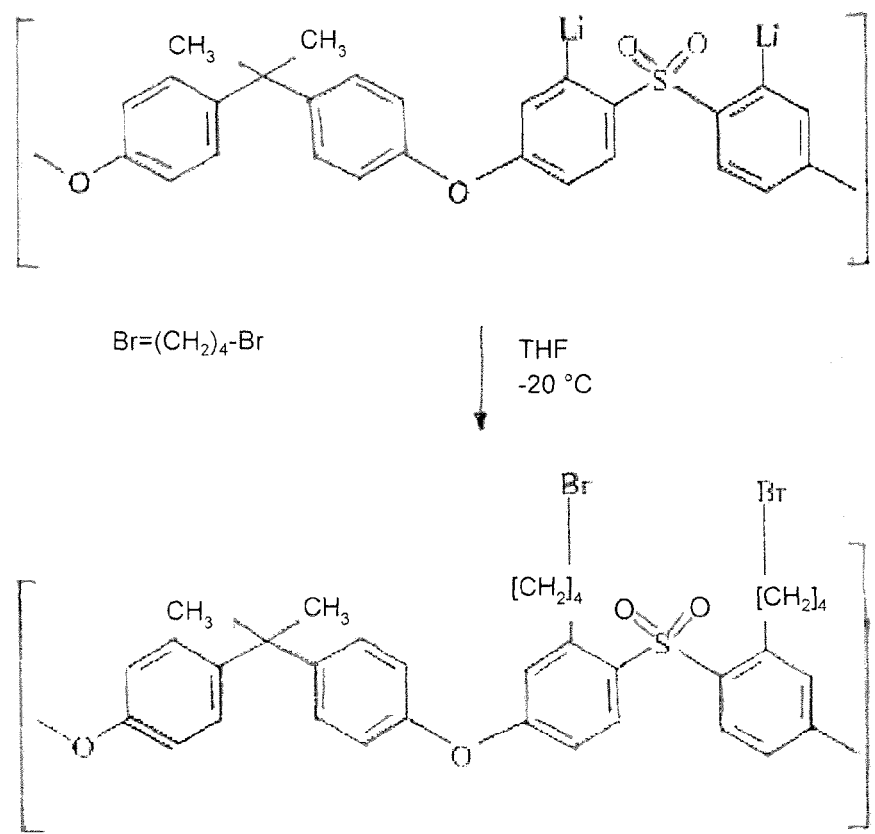
FIG. 12 illustrates a reaction of dilithiated PSU with dibrombutane, in accordance with one embodiment of the present invention.
Figure 13:
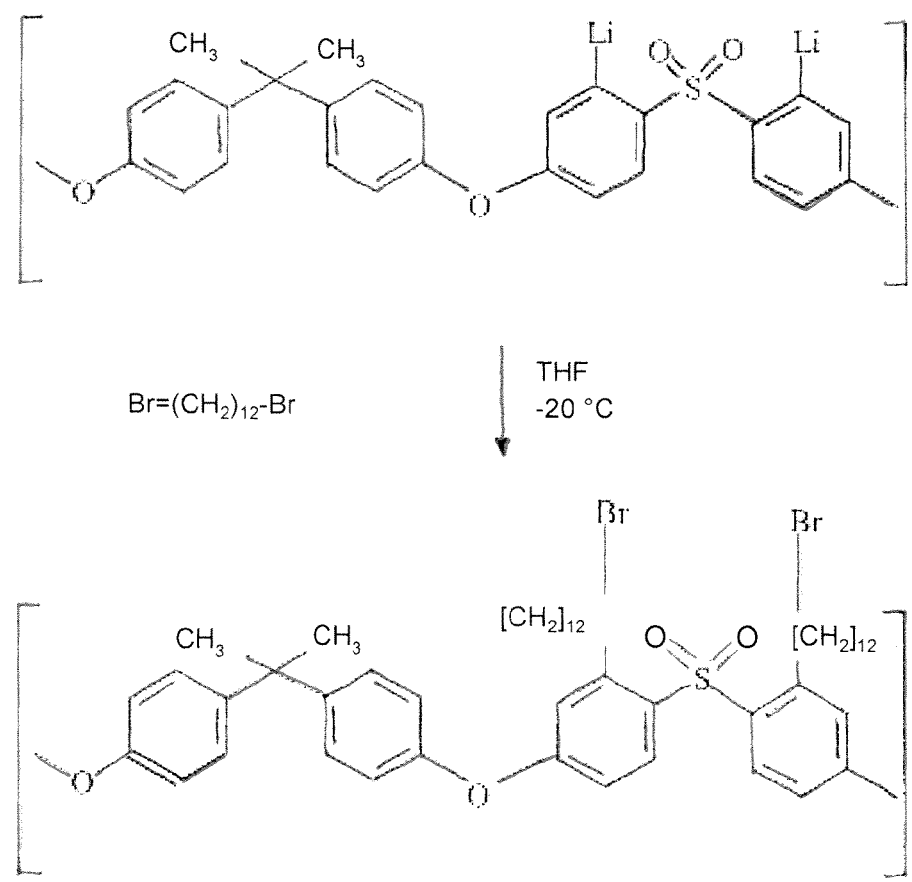
FIG. 13 illustrates a reaction of dilithiated PSU with dibromdodecane, in accordance with one embodiment of the present invention.
Figure 14:
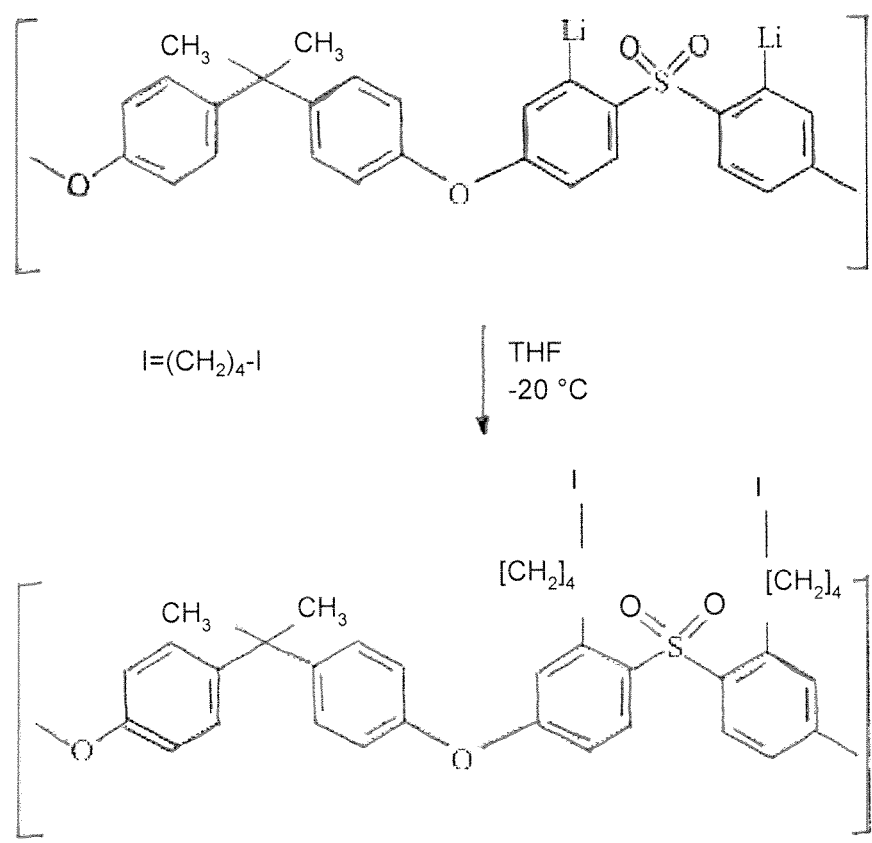
FIG. 14 illustrates a reaction of dilithiated PSU with diiodbutane, in accordance with one embodiment of the present invention.
Figure 15:
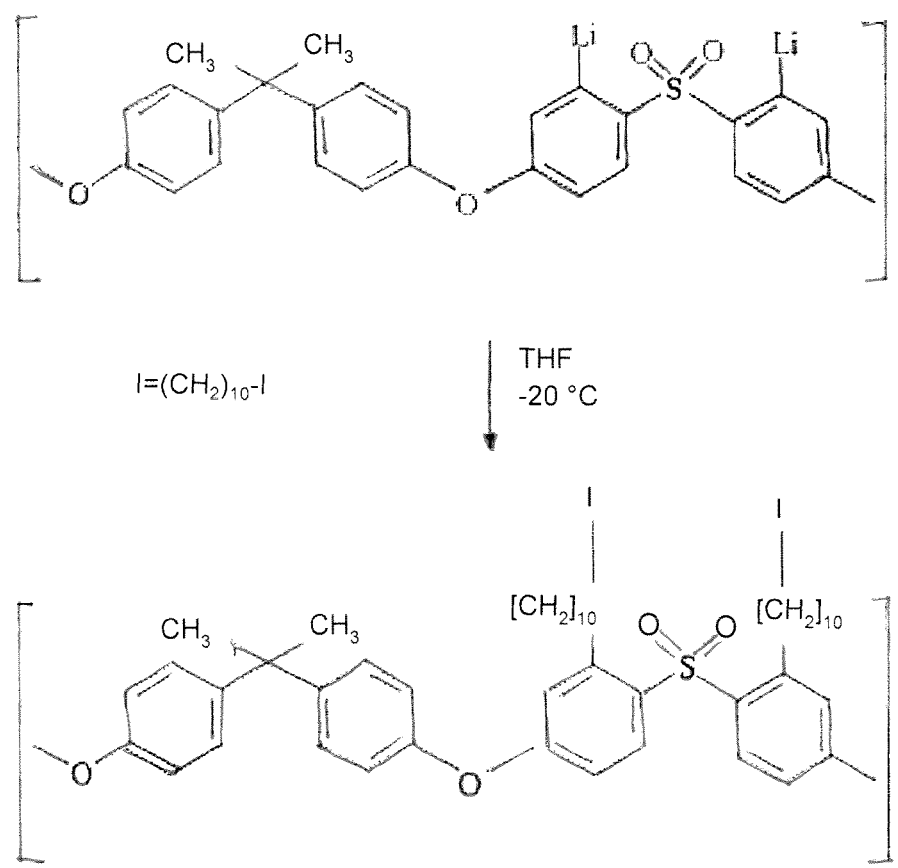
FIG. 15 illustrates a reaction of dilithiated PSU with diane, in accordance with one embodiment of the present invention.

Hereby sulfinate groups $SO_2M$ are especially preferred. There the sulfinates react with the halogenes preferred by S-Alkylation, as depicted in FIG. 8 for the reaction of a side-chain halogenated polymer with lithium sulfinatophenylphosphonic acid dialkylester.

Surprisingly it has been found, that membranes with a proton conducting functional group at the end of an alkyl-, aryl- or alkylaryl side chain can be made according to the following process:

In a suitable solvent (see below), whereby dipolar-aprotic solvents are preferred, the following components are mixed:
(1) polymer containing at least sulfinate groups $SO_2M$;
(2) low molecular di- or oligohalogenalcane (Hal-$(C(R_1)_2)_x$-Hal (Hal=F, Cl, Br, I; $R_1$=H, F, $C_nH_{2n+1}$, Aryl), Hal-$(C(R_1)_2)_x$-Aryl-Hal or Hal-$(C(R_1)_2)_x$—Z-Aryl-Hal)
(3) low molecular aromatic, aliphatic or aromatic-aliphatic compound, containing at least a sulfinate group and the non-ionic form of a cation exchange group.

If from the solution of these components a thin film is casted and then the solvent at increased temperature and if necessary reduced pressure is evaporated, covalently cross-linked membranes are formed, which contain the non-ionic form of the cation exchange group in the polymer side chain.

Suitable solvents for the reaction of the side-chain halogenated polymers with compounds containing a nucleophilic group and the ionic group or their non-ionic precursor are ether solvents as described above, hydrocarbon solvents (aliphatic or aromatic, as described above), dipolar-aprotic solvents such as NMP, DMAc, DMF, DMSO, Sulfolan, protic solvents such as alcoholes $C_nH_{2n+1}$, water or any other mixtures of these solvents with each other.

The reaction temperature for the metal organic reaction is from −100° C. to +100° C. Preferred is the temperature range from −80 to 0° C.

The reaction temperature for the reaction of the deprotonated polymer with the organic compound containing a halogen atom and one or more ionic groups or their non-ionic precursors is from −100° C. to +100° C. Preferred is the temperature range from −80 to 0° C.

The reaction temperature for the reaction of the deprotonated polymer with the dihalogen compounds is from −100° C. to +100° C. Preferred is the temperature range from −80 to 0° C.

The reaction temperature for the reaction of the side-chain halogenated polymer with nucleophilic groups and ionic groups or their non-ionic precursors is from −100° C. to +200° C. Preferred is the temperature range from −80 to +150° C.

Suitable solvents for the Michaelis-Arbusov-reaction of the side-chain halogenated polymers are ether solvents as described above, hydrocarbon solvents (aliphatic or aromatic, as described above), dipolar-aprotic solvents such as NMP, DMAc, DMF, DMSO, Sulfolan, protic solvents such as alcohols $C_nH_{2n+1}$, water or any other mixture of these solvents with each other. Preferred are dipolar-aprotic solvents, especially preferred is DMSO.

Suitable catalyst systems for the Michaelis-Arbusov-reaction are $NiCl_2$ (with use of Triethylphosphite as phosphonation agent) or $Pd(PPh_3)_4$/triethylamine (with use of $(EtO)_2POH$ as phosphonation agent). Preferred is $Pd(PPh_3)_4$/triethylamine as catalyst system.

Possible is also the use of sodium dialkylphosphite in THF as phosphonation agent. Also other processes known from the literature for this reaction are possible.

The reaction temperature for the Michaelis-Arbusov-reaction of the side-chain halogenated polymer with nucleophilic groups and ionic groups or their non-ionic precursors is from −100° C. to +200° C. Preferred is the temperature range from 0 to +150° C.

Suitable conditions for hydrolysis of the proton-conducting groups are:

Acid Ester:
—$PO(OR_2)_2$, —$COOR_2$, —$SO(OR_2)_2$: $Me_3SiBr/CCl_4$, 48% HBr, $BBr_3$, NaOH, HCl Acid Halides:
—$POHal_2$, $COHal$, $SO_2Hal$: 10% NaOH/90° C., 10% HCl/90° C., $H_2O$/90° C.

Acid Amides:
concentrated aqueous acids or bases

EXAMPLES

Reaction of Lithiated PSU with Diethyl-2-Bromethylphosphonate

Chemicals:
11.05 g PSU Udel P 1800 (0.025 mol) dried
1000 ml THF anhydrous
5 ml n-BuLi 10 N (0.05 mol)
24.51 g (0.1 mol) Diethyl-2-Bromethylphosphonate (M=245.06 g/mol, δ=1,348 g/cm³)
18.2 ml

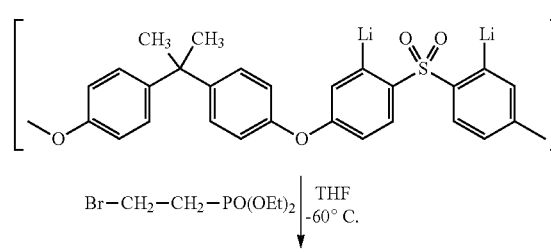

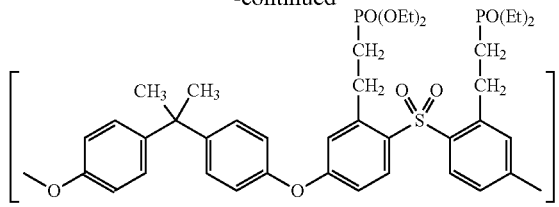

Procedure:

The reaction flask is loaded with THF under inert gas. Subsequently, the dried polymer powder is added under stirring and vigorous flushing with Argon. After the polymer is dissolved, it is cooled down to −60° C., under vigorous flushing with Argon. Then the polymer solution is titrated with n-BuLi (14 ml 2.5N n-BuLi, drum), until a slight yellow/orange colour indicates that the polymer solution is water-free from now on.

Then within 10 min the 10N n-BuLi is syringed in.

The stirring is continued for 2 hours. Then the solution of diethylbromethylphosphonate is added into the reaction mixture as fast as possible. Subsequently, the reaction mixture is stirred for 6 h at −60° C. Then, 100 ml solution is removed from the reaction mixture, which is hydrolyzed in methanol (EA and NMR), the temperature is increased to −40° C./24 h, subsequently to −20° C. and 0° C., under respective hydrolysis of 100 ml solution. Methanol is used as precipitant.

The precipitated polymer is dried at 60° C. From the product, the following analyses are prepared: $^1$H—, $^{13}$C and $^{31}$P-NMR, elemental analysis.

Addendum: The methanol-dissolved fractions from −60 to −20° C. are precipitated in methanol>very fine, mucous>not filterable: salting out with saturated table salt solution.

The biggest fraction at 0° C. is precipitated in water and filtered over 3 days (G2), washed with water and dried.

Relating to phosphorus content 1.37 groups per repeat unit are bound.

Reaction of Dilithiated PSU with Cl—CH$_2$—POCl$_2$

Chemicals:
11.05 g PSU Udel P 1.800 (0.025 mol) dried
1000 ml THF anhydrous
5 ml n-BuLi 10 N (0.05 mol)
16.7 g (0.1 mol) Chlormethanphosphonsäuredichlorid (M=167.36 g/mol, δ=1,638 g/cm$^3$)≈10.2 ml, SdP.: 78° C./10 mm

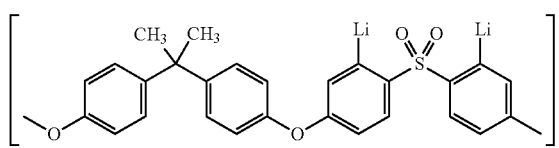

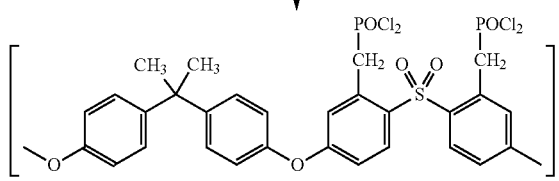

Procedure:

The reaction flask is loaded with THF under inert gas. Subsequently, the dried polymer powder is added under stirring and vigorous flushing with Argon. After the polymer is dissolved, it is cooled down to −60° C., under vigorous flushing with Argon. Then the polymer solution is titrated with n-BuLi (14 ml 2.5N n-BuLi, drum), until a slight yellow/orange colour indicates that the polymer solution is water-free from now on. Then within 10 min the 10N n-BuLi is syringed in. The stirring is continued for 2 hours. Then the solution of Chlormethanphosphonsäuredichloride (2-fold excess) is added into the reaction mixture as fast as possible. The solution changes colour at once to black and in a few minutes back to yellow-orange. Subsequently, the reaction mixture is stirred for 6 h at −40° C., increases the temperature for 24 h to −20° C., then for 12 h to 0° C. The polymer is precipitated from the solution with 4 l demineralised water. The polymer soon forms a yellow cake in the upper THF layer, which is separated and digested with methanol for 12 h.

The thus purified polymer is dried at 60° C. From the product, the following analyses are prepared: $^1$H-, $^{13}$C and $^{31}$P-NMR, elemental analysis.

Relating to phosphorus content 0.31 groups per repeat unit are bound.

Because the reaction at −60° C. is very fast, cool after addition of butyl lithium to −80° C., keep 12 h at −80° C., then follow the instructions as above from −60° C. to room temperature.

Reaction of Dilithiated PSU with Dibromhexane

Chemicals:
4.42 g PSU Udel P 1800 (0.01 mol) dried
300 ml THF anhydrous
2 ml n-BuLi 10 N (0.02 mol)
19.52 g Dibromhexane (0.08 mol, 243.98 g/mol)

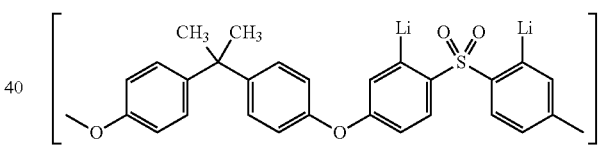

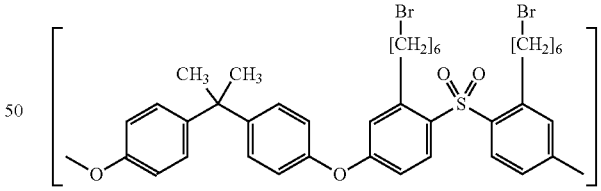

Procedure:

The reaction flask is loaded with THF under inert gas. Subsequently, the dried polymer powder is added under stirring and vigorous flushing with Argon. After the polymer is dissolved, it is cooled down to −60° C., under vigorous flushing with Argon. Then the polymer solution is titrated with n-BuLi (14 ml 2.5N n-BuLi, drum), until a slight yellow/orange colour indicates that the polymer solution is water-free from now on. Then within 10 min the 10N n-BuLi is syringed in. The stirring is continued for 2 hours. Then the solution of dibromhexane is added into the reaction mixture as fast as possible. Subsequently, the reaction mixture is stirred for 12 h at −20° C., the temperature is increased to 0°

C. for 4 h. The solution is hydrolysed with 10 ml MeOH, precipitated in 2 l MeOH, digested in MeOH and washed on the filter twice.

The thus purified polymer is dried at 25° C. under vacuum.

Relating to bromine content 0.87 groups per repeat unit are bound.

Reaction of Dilithiated PSU with Dibrombutane

Chemicals:

4.42 g PSU Udel P 1800 (0.01 mol) dried 300 ml THF anhydrous 2 ml n-BuLi 10 N (0.02 mol)

21.59 g Dibrombutane (0.1 mol, 215.9 g/mol)

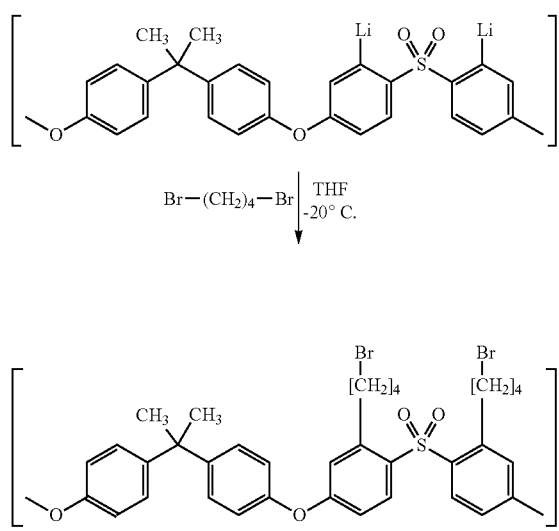

Procedure:

The reaction flask is loaded with THF under inert gas. Subsequently, the dried polymer powder is added under stirring and vigorous flushing with Argon. After the polymer is dissolved, it is cooled down to −60° C., under vigorous flushing with Argon. Then the polymer solution is titrated with n-BuLi (14 ml 2.5N n-BuLi, drum), until a slight yellow/orange colour indicates that the polymer solution is water-free from now on. Then within 10 min the 10N n-BuLi is syringed in. The stirring is continued for 2 hours. Then the solution of dibrombutane is added into the reaction mixture as fast as possible. Subsequently, the reaction mixture is stirred for 12 h at −20° C., the temperature is increased to 0° C. for 4 h. The solution is hydrolysed with 10 ml MeOH, precipitated in 2 l MeOH, digested in MeOH and washed on the filter twice.

The thus purified polymer is dried at 25° C. under vacuum.

Relating to bromine content 0.98 groups per repeat unit are bound.

Reaction of Dilithiated PSU with Dibromdodecane

Chemicals:

4.42 g PSU Udel P 1800 (0.01 mol) dried 300 ml THF anhydrous 2 ml n-BuLi 10 N (0.02 mol)

23.4 g Dibromdodecane (0.071 mol, 328.14 g/mol)

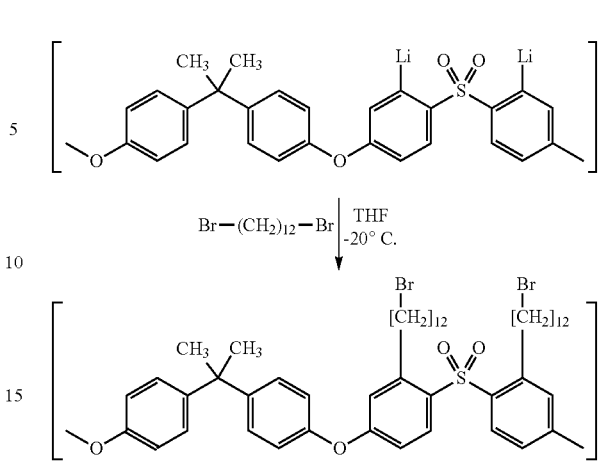

Procedure:

The reaction flask is loaded with THF under inert gas. Subsequently, the dried polymer powder is added under stirring and vigorous flushing with Argon. After the polymer is dissolved, it is cooled down to −60° C., under vigorous flushing with Argon. Then the polymer solution is titrated with n-BuLi (14 ml 2.5N n-BuLi, drum), until a slight yellow/orange colour indicates that the polymer solution is water-free from now on. Then within 10 min the 10N n-BuLi is syringed in. The stirring is continued for 2 hours. Then the solution of dibromdodecane is added into the reaction mixture as fast as possible. Subsequently, the reaction mixture is stirred for 12 h at −20° C., the temperature is increased to 0° C. for 4 h. The solution is hydrolysed with 10 ml MeOH, precipitated in 2 l MeOH, digested in MeOH and washed on the filter twice.

The thus purified polymer is dried at 25° C. under vacuum.

Relating to bromine content 0.3 groups per repeat unit are bound.

Reaction of Dilithiated PSU with Diiodbutane

Chemicals:

4.42 g PSU Udel P 1800 (0.01 mol) dried 300 ml THF anhydrous 2 ml n-BuLi 10 N (0.02 mol)

62 g Diiodbutane (0.2 mol, 309.92 g/mol)

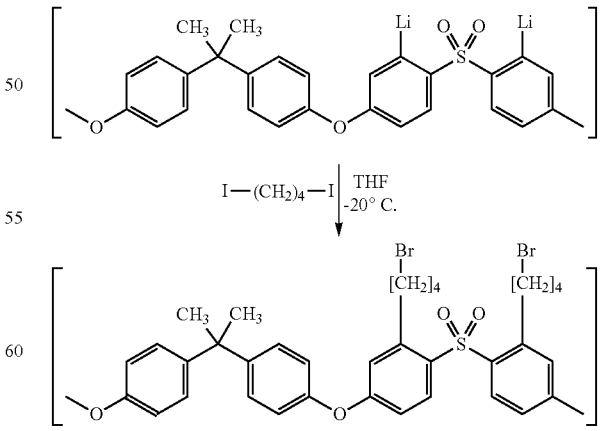

Procedure:

The reaction flask is loaded with THF under inert gas. Subsequently, the dried polymer powder is added under stirring and vigorous flushing with Argon. After the polymer is dissolved, it is cooled down to −60° C., under vigorous flushing with Argon. Then the polymer solution is titrated with n-BuLi (14 ml 2.5N n-BuLi, drum), until a slight yellow/orange colour indicates that the polymer solution is water-free from now on. Then within 10 min the 10N n-BuLi is syringed in. The stirring is continued for 2 hours. Then the solution of diiodbutane is added into the reaction mixture as fast as possible. Subsequently, the reaction mixture is stirred for 12 h at −20° C., the temperature is increased to 0° C. for 4 h. The solution is hydrolysed with 10 ml MeOH, precipitated in 2 l MeOH, digested in MeOH and washed on the filter twice.

The thus purified polymer is dried at 25° C. under vacuum.
Relating to iodine content 1.51 groups per repeat unit are bound.
Reaction of Dilithiated PSU with Diioddecane
Chemicals:
4.42 g PSU Udel P 1800 (0.01 mol) dried
300 ml THF anhydrous
2 ml n-BuLi 10 N (0.02 mol)
38 g diioddecane (0.096 mol, 394.08 g/mol)

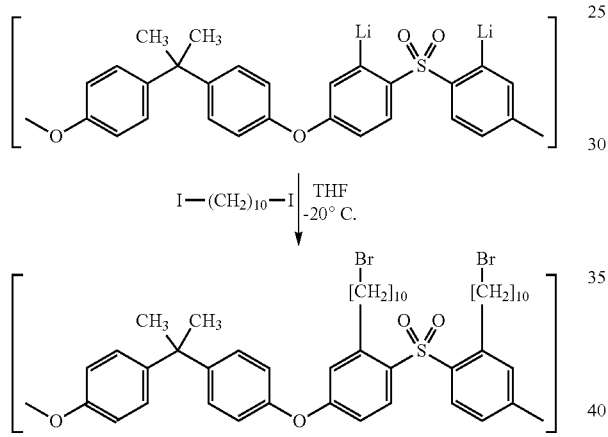

Procedure:

The reaction flask is loaded with THF under inert gas. Subsequently, the dried polymer powder is added under stirring and vigorous flushing with Argon. After the polymer is dissolved, it is cooled down to −60° C., under vigorous flushing with Argon. Then the polymer solution is titrated with n-BuLi (14 ml 2.5N n-BuLi, drum), until a slight yellow/orange colour indicates that the polymer solution is water-free from now on. Then within 10 min the 10N n-BuLi is syringed in. The stirring is continued for 2 hours. Then the solution of diioddecane is added into the reaction mixture as fast as possible. Subsequently, the reaction mixture is stirred for 12 h at −20° C., the temperature is increased to 0° C. for 4 h. The solution is hydrolysed with 10 ml MeOH, precipitated in 2 l MeOH, digested in MeOH and washed on the filter twice.

The thus purified polymer is dried at 25° C. under vacuum.
Relating to iodine content 0.56 groups per repeat unit are bound.
Production of a Covalently Cross-Linked Ionomomer Membrane 3 g PSU(SO$_2$Li)$_2$ (2 sulfinate groups per PSU repeating unit, sulfinate-IEC=3.4 meq SO$_2$Li/g polymer) are dissolved in 17 g NMP. 2.7 mmol meta-LiO$_2$S-benzolphosphonic acid dioctylester (obtained by lithiation of benzolphosphonic acid dioctylester under Argon in THF and subsequent reaction with SO$_2$) and 0.4 mmol 1,4-Diiodbutan are added to the solution and let to homogenise. Then the polymer solution is casted on a support (glass plate or metal plate and/or cloth/vlies/microporous membrane). The solvent is evaporated in a ventilated or vacuum drying oven increased temperature of 50 to 140° C. Hereby the sulfinate-S-alkylation of the sulfinato-benzolphosphonic acid ester and the diiodbutane takes place and the membrane cross-links. After solvent evaporation the membrane is posttreated to saponificate the phosphonic acid ester with 48% HBr or concentrated HCl under reflux.

CITED NON-PATENT LITERATURE

[1] Wainwright J. S., Wang, J-T; Weng, D.; Savinell, R. F., Litt, M. H. *J. Electrochem. Soc.* 1995, 142, L121
[3] H. R. Allcock, M. A. Hofmann, R. M. Wood, Macromolecules 2001, 34, 6915-6921

We claim:
1. A process for producing a side-chain modified polymer, comprising:
  deprotonating a polymer with an arylene main chain in a metal organic reaction that yields a metalized polymer, the metal organic reaction involving a metallic species selected from the group consisting of Li, Na, and halides of Mg and Zn, the halides being chloride, bromide or iodide;
  reacting the metalized polymer with a di-halogen compound to yield a polymer with one or more halogenated side chain, the di-halogen compound having two or more carbons; and
  reacting the polymer with the one or more halogenated side chain with a nucleophilic species of the general formula rNu-R$_2$Y$_m$, to yield polymeric ionomers having the following structure:

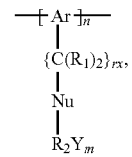

wherein:
  Ar is a repeating unit of the arylene main chain polymer;
  n is the number of the repeating units;
  R$_1$ is H, F or an alkyl- or aryl residue;
  r is the number of side chains for each of the repeating units;
  x is the length of each side chain;
  Nu is a nucleophilic compound; and
  Y is selected from the group consisting of:

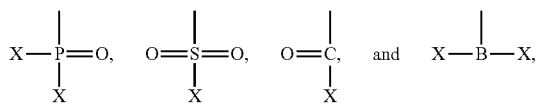

in which X is selected from the group consisting of halogens, OH, OM$^+$, OR$_2$, and N(R$_3$)$_2$, M$^+$ being a univalent metal cation, and R$_2$ and R$_3$ each being selected from the group consisting of H, alkyl residues and aryl residues.

2. The process of claim 1, wherein the di-halogen compound being of the general formula: Hal-C(R$_1$)$_x$—U, wherein Hal is a halogen, x is equal or greater than 2 and U is selected from the group consisting of:

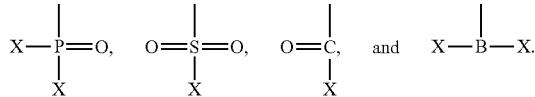

3. The process of claim 2, wherein the polymeric isomers are hydrolysed.

4. The process of claim 1, wherein the arylene main chain is selected from the group consisting of: polyolefines, polyethylen, polypropylen, polyisobutylen, polynorbornen, polymethylpenten, poly(1,4-isopren), poly(3,4-isopren), poly(1,4-butadien), poly(1,2-butadien) and block-, alternating or statistical copolymers of polydiene, polybutadiene and polyisoprene with styrole, styrol(co)polymere, polystyrole, poly(methylstyrole), poly(α,β,β-trifluorstyrole), poly(pentafluorostyroie), perfluorinated ionomeres, partly-fluorinated polymers, polyvinylidenfluoride, polyvinylfluoride and their copolymers with polyolefines or with arylmain chain polymers, N-basic polymers, polyvinylcarbazole, polyethylenimine, poly(2-vinylpyridine), poly(3-vinylpyridine), poly(4-vinylpyridine), and (Het)aryl main chain polymers.

5. The process of claim 1, wherein the arylene main chain is selected from the group consisting of: polyetherketones, polyetheretherketoneketone, polyethersulfone, poly(benz)imidazole, and oligomers and polymers containing the (benz)imidazole unit, polyphenylenether, poly(2,6-dimethyloxyphenylen), poly(2,6-diphenyloxyphenylen), polyphenylensulfide and copolymers, poly(1,4-phenylene) and poly(1,3-phenylene), modified in the side chain with benzoyl-, naphtoyl- or o-phenyloxy-1,4-benzoylgroups, m-phenyloxy-1,4-benzoylgroup or p-phenyloxy-1,4-benzoyl groups, poly(benzoxazole) and copolymers, poly(benzthiazole) and copolymers, poly(phtalazinone and copolymers, polyanilin and copolymers, polythiazoles, polypyrroles and (het)aryl main chain polymers.

6. The process of claim 1, wherein the arylene main chain is selected from the group consisting of:

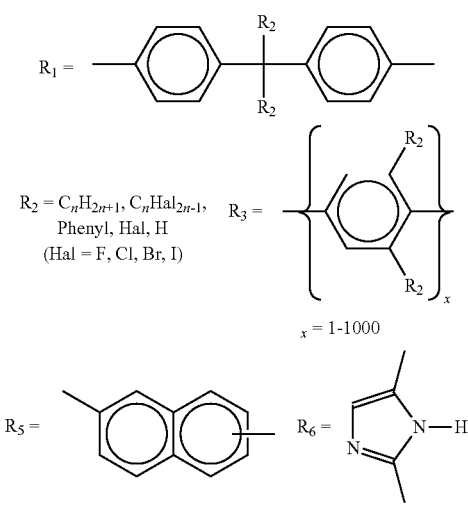

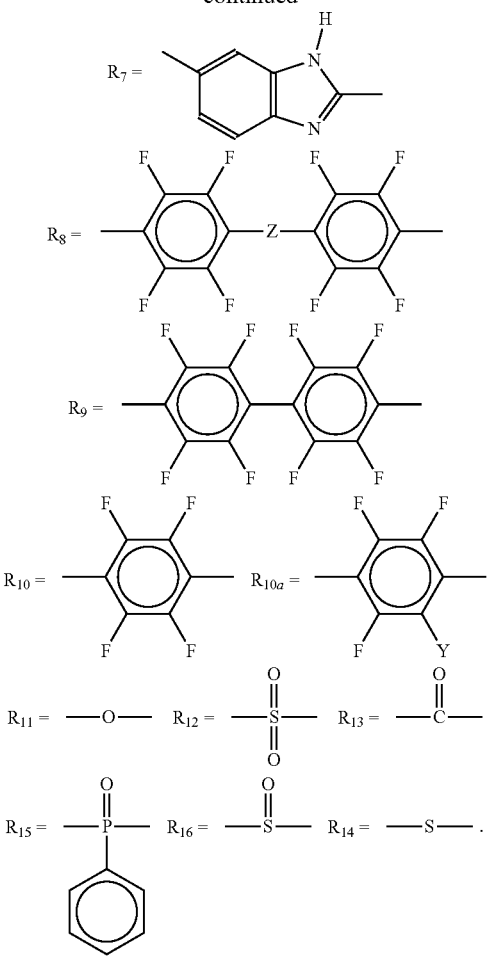

7. The process of claim 1, wherein deprotonating is performed using one or more reagents selected from the group consisting of n-butyllithium, sec-butyllithium, tert-butyllithium, methyllithium, phenyllithium, phenylmagnesiumhalogenide and other Grignard reagents, lithiumdiisopropylamide, and other lithium amides, sodium naphtalide, potassium naphtalide, and zinc organic compounds ("Rieke metals").

8. The process of claim 1, wherein deprotonating is performed using a solvent selected from the group consisting of THF, diethylether, glyme, triglyme, dioxane ether solvents, hydrocarbon solvents C$_n$H$_{2n+2}$, cyclohexane, benzene, toluene, xylole, other C—H— aromatic solvents and mixtures thereof.

9. The process of claim 1, wherein the di-halogen compound is provided in a solvent selected from the group consisting of: compounds containing a nucleophilic group, an ionic group, its non-ionic precursor, aliphatic or aromatic hydrocarbon solvents, dipolar-aprotic solvents, protic solvents, alcohols, water and mixtures thereof.

10. The process of claim 1, wherein the di-halogen compound is selected from the group consisting of: Hal-(C(R$_1$)$_2$)$_x$-Hal, Br—(C(R$_1$)$_2$)$_x$—I, Hal-(C(R$_1$)$_2$)$_x$-Aryl-Hal, Hal-(C(R$_1$)$_2$)$_x$—Z-Aryl-Hal, wherein Hal is F, Cl, B, or I, R$_1$ is H, F, C$_n$H$_{2n+1}$, or an aryl residue, and Z is selected from the group consisting of:

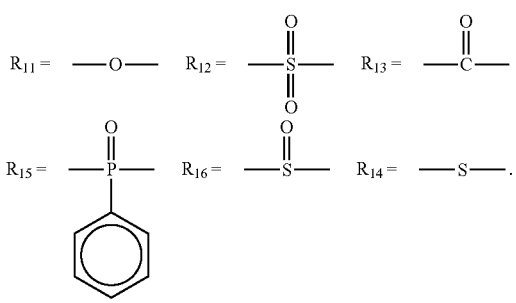

11. The process of claim 1, wherein the di-halogen compound selected from the group consisting of:

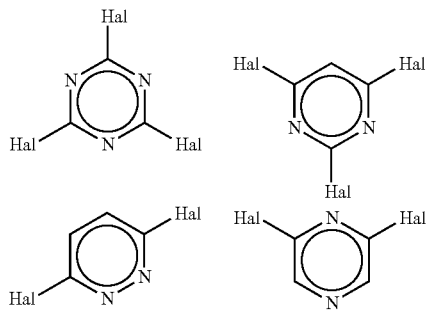

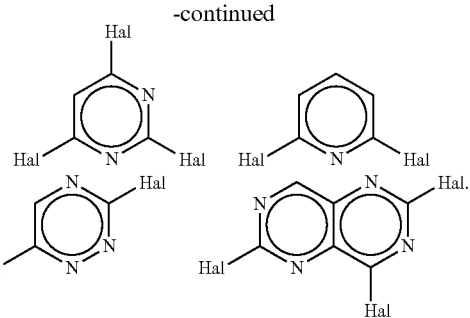

Hal = F, Cl, Br, I where Hal is F, Cl, B, or I.

12. The process of claim 1, wherein the polymeric ionomers contains phosphonic acid, carbonic acid, boronic acid or their non-ionic precursor.

13. The process of claim 1, further comprising forming the polymeric ionomers into membranes.

14. The process of claim 13, further comprising providing the membranes in a fuel cell.

15. The process of claim 1, wherein the nucleophilic species is selected from the group consisting of cations of $R_4$—N$(R_4)_2$ or $R_4$—$SO_2M$, $R_4$—$S^-$, $R_4$—$O^-$, $R_4$—$SCN^-$, $R_4$—$OCN^-$, $R_4$—$CN^-$, $C_2(R_4)_3^-$, and $CH$—$(COOR_4)_2^-$, where M is a univalent metal and $R_4$ is H, F, or an alkyl-, aryl- or benzyl-residue.

* * * * *